United States Patent [19]

Olson

[11] 4,344,830

[45] Aug. 17, 1982

[54] UV CURABLE RESINS AND SULFONATE ESTERS OF BENZOTRIAZOLES USED IN SUCH RESINS

[75] Inventor: Daniel R. Olson, Schenectady, N.Y.

[73] Assignee: General Electric Company, Schenectady, N.Y.

[21] Appl. No.: 151,663

[22] Filed: May 20, 1980

Related U.S. Application Data

[63] Continuation of Ser. No. 660,260, Feb. 23, 1976, abandoned.

[51] Int. Cl.$^3$ .................. C08K 5/27; C08F 2/50
[52] U.S. Cl. .................. 204/159.16; 204/159.18; 204/159.24; 523/300; 524/91
[58] Field of Search .................. 204/159.18, 159.16, 204/159.24; 523/300; 524/91

[56] References Cited

U.S. PATENT DOCUMENTS

| | | | |
|---|---|---|---|
| 2,835,649 | 5/1958 | Nicholson | 260/45.85 R |
| 3,004,896 | 10/1961 | Heller et al. | 260/45.8 NT |
| 3,616,367 | 10/1971 | Zunker | 204/159.16 |
| 3,978,178 | 8/1976 | Oshima et al. | 264/25 |

OTHER PUBLICATIONS

Kosar, "Light Sensitive Systems" Wiley 1965, pp. 160, 161, 170, 171, 172.
Stratenus et al., "Photoreactions . . ." Recueil (1966) vol. 85, pp. 434–436.
Snell "Pyrimidines . . ." Journal of the Chemical Society (London) (C) 1968, pp. 2367–2370.
Nasielski et al., "Photo-Fries Rearr. . . ." Tetrahedron vol. 28, 1972, pp. 5025–5028.

*Primary Examiner*—John C. Bleutge
*Assistant Examiner*—A. H. Koeckert
*Attorney, Agent, or Firm*—William A. Teoli; James C. Davis, Jr.

[57] ABSTRACT

Sulfonate esters of hydroxybenzotriazoles have been found useful in imparting weathering resistance to plastic substrates when applied as part of a UV curable resin which is thereafter cured under ultraviolet light.

5 Claims, No Drawings

UV CURABLE RESINS AND SULFONATE ESTERS OF BENZOTRIAZOLES USED IN SUCH RESINS

This application is a continuation of copending application Ser. No. 660,260, filed Feb. 23, 1976, now abandoned.

The present invention relates to sulfonate esters of hydroxybenzotriazoles in UV curable organic resins and to the UV curable organic resins containing such sulfonate esters.

Prior to the present invention, the plastics industry was constantly looking for suitable UV stabilizers to treat a wide variety of thermoplastics, such as polycarbonates, polyphenylene oxides, etc., in various applications in which the plastic parts were exposed to sunlight and other atmospheric conditions. Those skilled in the art know, for example, that after an extended period of exposure, thermoplastics, such as polystyrene, tend to acquire a yellow color which reduces the attractiveness of the finished part and its utility. Among the ways to improve the weatherability and sunlight resistance of thermoplastics include coating the surface of the thermoplastic with an organic resin containing a UV stabilizer, such as a hydroxybenzotriazole or a hydroxybenzophenone, and thereafter effecting the cure of the organic resin. A heat cure of an organic thermoplastic or thermoset resin, or the use of a preformed thermoplastic or sheet containing the stabilizer are some of the ways which have been used to provide a protective coating for the thermoplastic sheet. Recently, a wide variety of UV curable acrylic and polyester formulations have been developed which can be painted onto the surface of a variety of substrates, including plastic substrates, and cured within a minute or less under ultraviolet light. However, it has been found that if a UV stabilizer such as a hydroxybenzophenone or hydroxybenzotriazole is employed in the UV curable resin, the stabilizer absorbs a major portion of the UV light and interferes with the cure of the UV curable resin.

As shown by British patent No. 974,713, non-absorbing, substituted 2-phenylbenzotriazole compounds, such as 2-(2-alkenyloxyphenyl)-benzotriazole, can be thermally decomposed and rendered UV absorbing after a period of about 1 hour, or more, at a temperature of 180°–220° C. Although valuable results can be obtained by the use of such non absorbing substituted 2-phenylbenzotriazoles, a relatively high decomposition temperature and an extended time is required to effect the liberation of the "UV filter". As a result, the potential use of these materials by the plastics industry is often not fully realized.

The present invention is based on the discovery that certain nonabsorbing sulfonate esters of hydroxybenzotriazoles, as shown below by Formula 1, can be used in UV curable organic resins, such as acrylic resins, to provide cured films on thermoplastic substrates. The hydroxybenzotriazoles can thereafter be rendered absorbing and function as a UV stabilizer when the treated plastic sheet is used in a conventional manner under atmospheric conditions. The sulfonate esters which can be used in the practice of the present invention have the formula:

$$Z\text{-}SO_2\text{-}R, \qquad (1)$$

where Z is

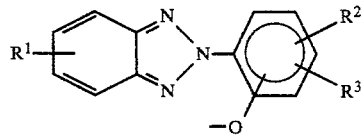

R is selected from $C_{(6-13)}$ aryl radicals, and $R^1$, $R^2$, and $R^3$ are the same or different monovalent radicals selected from hydrogen, halogen, $C_{(1-20)}$ alkyl, $C_{(1-20)}$ alkoxy, and R radicals.

Radicals included by R are for example, phenyl, tolyl, xylyl, chlorophenyl, bromotolyl, etc. Radicals included by $R^1$, $R^2$ and $R^3$ are alkyl radicals, such as methyl, ethyl, propyl, butyl, etc.; halogen, such as chloro, bromo, fluoro, etc.; alkoxy, such as methoxy, ethoxy, propoxy, butoxy, etc.; aryl, such as the above R radicals, etc.

Included by the sulfonate esters of Formula 1 are, for example, 2-(2H-benzotriazol-2-yl)-4-t-octylphenyl benzenesulfonate, 2-(2H-benzotriazol-2-yl)-4-methylphenyl benzenesulfonate, 2-(2H-benzotriazol-2-yl)-4-t-octylphenyl 4-methylbenzenesulfonate, 2-(2H-benzotriazol-2-yl)-4-methylphenyl 4-methylbenzenesulfonate, 2-(2H-benzotriazol-2-yl)-4-t-octylphenyl 4-methoxybenzenesulfonate, 2-(2H-benzotriazol-2-yl)-4-(octyloxy)phenyl benzenesulfonate, etc.

In addition to the above described sulfonate esters of the present invention, there are also provided by the present invention UV curable organic resin compositions comprising an organic resin, such as an acrylic resin, a polyester resin, an epoxy resin, a polythio-polyene resins, etc., containing from 0.1 to 10% by weight of the above described sulfonate ester, based on the total weight of the UV curable organic resin composition.

Acrylic resins which can be employed in the practice of the present invention are, for example, mixtures of olefinically unsaturated organic monomers, such as methyl methacrylate, in combination with polymers, such as polymethylmethacrylate, polymethylacrylate, polyethylacrylate, etc. The proportion of the aforementioned olefinically unsaturated monomer and polymer in the acrylic resin can vary widely. For example, there can be utilized from about 30 to 90 parts of olefinically unsaturated monomer, per part of acrylic resin. Other acrylic resins which can be used are shown by Bassemir U.S. Pat. No. 3,558,387, etc.

In addition to the above described acrylic resins, there also can be used in the practice of the present invention to make the UV curable organic resin compositions, polyesters, such as reaction products of aliphatic dicarboxylic acids, including, for example, fumaric or maleic acid, with glycols, such as ethyleneglycol, propyleneglycol, neopentylglycol, etc., and mixtures thereof, dissolved in monomers, such as styrene, etc. Other polyester resins are shown by Barnes et al. U.S. Pat. No. 3,714,007, etc.

Epoxy resins also can be used as the organic resin and include monomeric, dimeric, oligomeric or polymeric epoxy material containing one, or a plurality of epoxy functional groups. For example, reaction products of bisphenol-A and epichlorohydrin, or epichlorohydrin with phenol-formaldehyde resins, etc. Further examples are shown in Vol. 6, 1967, Interscience Publishers, New York, pp. 209–271 of the Encyclopedia of Polymer Science and Technology. Other organic resins can be in the form of mixtures of polyolefin and polythiols, such as shown by Kehr et al, U.S. Pat. Nos. 3,697,395 and 3,697,402. Photoinitiators which can be used to effect cure of the organic resins include ketones, benzoin ethers, quinones, or cationic initiators as described by Schlesinger Patent 3,708,296, etc. Also, dyes, pigments, fillers and other additives can be present. The sulfonate esters of the present invention can be made by standard procedures employing the corresponding hydroxybenzotriazole of the formula:

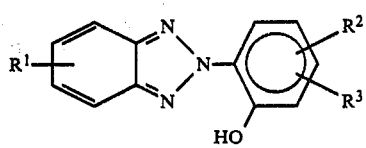

(2)

where $R^1$, $R^2$ and $R^3$ are as previously defined, with an organic sulfonyl halide. Included by the hydroxybenzotriazoles of Formula 2, are for example, 2-(2'-hydroxy-5'-methyl phenyl)-benzotriazole, 2-(2'-hydroxy-5'-t-octylphenyl)-benzotriazole, 2-(2'-hydroxy-5'-methylphenyl)-5-chlorobenzotrizole, 2-[2'-hydroxy-5'-(octyloxy)-phenyl]-benzotriazole, etc. Included by the organosulfonyl halides are, for example, arylsulfonyl chlorides, such as benzenesulfonyl chloride, p-toluenesulfonyl chloride, 4-methoxybenzenesulfonyl chloride, etc.

The UV curable organic resin compositions of the present invention can be applied to a variety of substrates, such as polycarbonate substrates, polyphenylene oxide substrates, polystyrene substrates, polybutylene phthalate substrates, etc., and thereafter, cure of the resin can be effected under ultraviolet light by standard procedures. The UV curable resin composition can be applied by a screen coater, a roller coater, painting, etc. The UV curable resin composition can be applied to a thickness of from 0.2 to 10 mils to provide an adequate stabilizing effect on the cured film.

Cure of the organic resin can be achieved by the use of a standard UV lamp, such as a medium pressure mercury arc, a fluorescent light tube, a xenon flash lamp, laser, carbon arc, etc.

In order that those skilled in the art will be better able to practice the invention, the following examples are given by way of illustration and not by way of limitation. All parts are by weight.

EXAMPLE 1

There was added 44 parts of benzenesulfonyl chloride to a stirred solution of 64.3 parts of 2-(2'-hydroxy-5'-t-octylphenyl)-benzotriazole and 8 parts of sodium hydroxide in about 250 parts of acetone and 25 parts of water. After stirring the mixture for 1 hour at room temperature, the mixture was poured into 2,000 parts of water. A solid precipitated which was collected and recrystallized from ethyl acetate-hexane to give 78.3 parts or an 35% yield of 2-(2H-benzotriazol-2-yl)-4-t-octylphenyl benzenesulfonate, having a melting point of 94°–96° C. The identity of the sulfonate ester was confirmed by its infrared and NMR spectra. Elemental analysis for $C_{26}H_{29}N_3O_3S$; Calc.: C, 67.4; H, 6.3; N 9.1 Found: C, 67.8; H, 6.4; N, 9.2.

EXAMPLE 2

A solution of 9 parts of 2-(2'-hydroxy-5'-methylphenyl)-benzotriazole, 8.3 parts of benzenesulfonyl chloride, and 4.4 parts of triethyl amine, in about 10 parts of dichloromethane was stirred 20 hours at room temperature. The solvent was evaporated and the residue was redissolved in a solvent mixture of 50% benzene and 50% ether by weight followed by washing with 5% potassium hydroxide, 5% hydrochloric acid, water and saturated sodium chloride solution. The solution was then dried with magnesium sulfate and the solvent evaporated from the resulting filtered solution. Recrystallization from ethyl acetate-hexane solvent provided 11.84 parts, or 81% yield, of 2-(2H-benzotriazol-2-yl)-4-methylphenyl benzenesulfonate having a melting point of 98°–100° C. The identity of the product was confirmed by its infrared and NMR spectra. Calculated for a $C_{19}H_{15}N_3O_3S$: C, 62.5; H, 4.1; N, 11.5. Found: C, 62.9; H, 4.4; N, 11.7.

EXAMPLE 3

A UV curable resin of the present invention was prepared by blending together 40 parts of polymethylmethacrylate having a molecular weight of about 10,000, 60 parts of methylmethacrylate, 1 part of benzoin ethyl ether, 0.5 part of paraffin wax and 3 parts of 2-(2H-benzotriazol-2-yl)-4-t-octylphenyl benzenesulfonate. In addition to the aforementioned UV curable composition of the present invention (Solution A), there was also prepared a UV curable composition free of the sulfonate ester (Solution B) and a third UV curable composition (Solution C) containing 1 part of unreacted 2-(2'-hydroxy-5'-t-octylphenyl)-benzotriazole in place of the 3 parts of the sulfonate ester of Solution A.

Polycarbonate panels were then coated with the above described UV curable organic resin compositions to a thickness of about 2 mils respectively. There was employed a GEH3T7 lamp which was positioned about 4 inches from the panels. The respective treated panels were exposed for a period of from 3–6 minutes and thereafter heated for 1 hour at 150° C.

Table I below shows the results obtained with respect to percent weight loss of unreacted monomer, based on the weight of the exposed panel, before and after the heating period, where "Solution A" is the UV curable composition of the present invention containing the sulfonate ester, "Solution B" is the resin which is free of stabilizer and "Solution C" is the composition containing the hydroxyphenylbenzotriazole.

TABLE I

|  | % WT Loss of monomer |
| --- | --- |
| Solution A | 5–6 |
| Solution B | 5–6.5 |
| Solution C | 22–31 |

The above results show that the hydroxyphenylbenzotriazole interfered with the cure of the resin on the polycarbonate panel (Solution C), whereas the composition of the present invention (Solution A) containing the sulfonate ester, was substantially the same as the resin free of any stabilizer (Solution B).

The above procedure was repeated except that after the polycarbonate panels had been treated and exposed with solutions A and B, they were then exposed for a period of up to 800 hours under a General Electric RS-sunlamp to determine the amount of yellowing which occurred as a result of exposing the polycarbonate panel to ultraviolet light. The term "ΔYI" indicates the degree of yellowing, and 5ΔYI shows the minimum degree of yellowing discernable to the human eye. As shown in Table II below, "Sheet A" represents the polycarbonate panel treated with the composition of the present invention, "Sheet B" represents the panel treated with the composition free of the sulfonate ester, and "Sheet D" represents an untreated polycarbonate panel.

TABLE II

|  | ΔYI after 800 hrs. |
|---|---|
| Sheet A | 3.3 |
| Sheet B | 11.3 |
| Sheet D | 11.3 |

The above results show that Sheet A resisted the effect of exposure to 800 hours so that no discernable yellowing occurred. The panels treated with the resin free of the sulfonate ester (Sheet B), and the untreated panel (Sheet D) show that a significant amount of yellowing occurred after an 800 hour exposure period. Those skilled in the art would know from the results shown above in Tables I and II above that the sulfonate ester of the hydroxybenzotriazole of the present invention can be used in UV curable resin compositions without interfering with the cure of the resin (Table I), and thereafter functioning as a stabilizer for various thermoplastic sheets to improve their respective weatherability.

Also included by the present invention are substituted benzotriazoles of the formula, $$Z'\text{-}[SO_2\text{-}]R \quad (3)$$

where Z' is

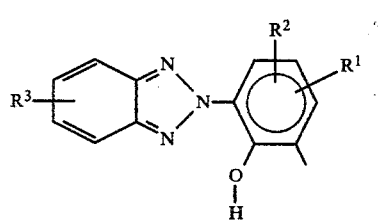

and R, $R^1$, $R^2$ and $R^3$ are as previously defined.

The substituted benzotriazoles of formula 3 can be made by photolyzing the compounds of formula (1) to effect rearrangement of the sulfonyl organo group. The following examples illustrate the preparation of these compounds:

EXAMPLE 4

A solution of 1.5 parts of 2-(2H-benzotriazole-2-yl)-4-methylphenyl sulfonate in 50 parts of ethyl acetate was photolyzed through quartz tubes for 12 hours in a Rayonette merry-go-round using 3000 Å light. A precipitate was filtered to give 0.6 part of a white solid MP 250°–252° C. Based on method of preparation and its infrared spectrum, the product was 2-(2'-hydroxyl-3'-benzenesulfonyl-5'-methyl)-benzotriazole. Anal. for $C_{19}H_{15}N_3O_3S$: Calc. C, 62.5; H, 4.1, N, 11.5. Found: C, 63.0; H, 4.3; N, 11.7.

EXAMPLE 5

Following the procedure of Example 4, the sulfonate ester of Example 1 was converted to 2-(2'-hydroxy-3'-benzenesulfonyl-5'-t-octyl)-benzotriazole having a MP 220°–223° C. Anal. for $C_{26}H_{29}N_3O_3S$:C, 67.4; H, 6.3; N, 9.1. Found: C, 67.6; H, 6.6; N, 9.2.

The compounds of Examples 4 and 5 are valuable UV stabilizers for heat curable organic resins which can be applied as protective coatings on thermoplastic substrates.

Although the above examples are limited to only a few of the vary many variables of the present invention, it should be understood that the present invention is broadly directed to sulfonate ester compositions of hydroxybenzotriazoles and to UV curable compositions containing such stabilizers as shown, for example, by Formula 1 and the description preceding these examples.

What I claim as new and desire to secure by Letters Patent of the United States is:

1. A UV curable paintable composition consisting essentially of UV curable material selected from the class consisting of an acrylic monomer-polymer mixture, a polyester resin, an epoxy resin, and a polythiol-polyene resin, from 1 to 10 parts of a photoinitiator selected from the class consisting of ketones, benzoin ethers, quinones, and a cationic initiator, per 100 parts of the UV curable organic material and 0.1 to 10% by weight of the UV curable composition of a sulfonate ester of the formula, $$Z\text{-}[SO_2\text{-}]R,$$

where Z is

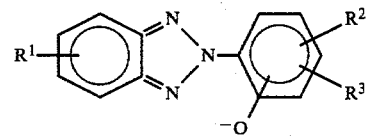

R is selected from $C_{(6-13)}$ aryl radicals and $R^1$, $R^2$, and $R^3$ are the same of different monovalent radicals selected from hydrogen, halogen, $C_{(1-20)}$ alkyl, $C_{(1-20)}$ alkoxy, and R radicals.

2. A UV curable composition in accordance with claim 1, where the UV curable organic material is an acrylic monomer-polymer mixture.

3. A UV curable composition in accordance with claim 1, where the sulfonate ester is 2-(2H-benzotriazole-2-yl)-4-t-octylphenylbenzenesulfonate.

4. A UV curable composition in accordance with claim 1, where the sulfonate ester is 2-(2H-benzotriazole-2-yl)-4-methylphenylbenzenesulfonate.

5. A UV curable composition consisting essentially of polymethylmethacrylate and olefinically unsaturated monomer, an effective amount of paraffin wax, from 1 to 10 parts of benzoin ethyl ether per 100 parts of the polymethylmethacrylate and 0.1 to 10% by weight of the UV curable composition of 2-(2H-benzotriazole-2-yl)-4-t-octylphenylbenzenesulfonate.

* * * * *